United States Patent
Dawes (12)

(10) Patent No.: US 6,587,440 B1
(45) Date of Patent: Jul. 1, 2003

(54) METHOD FOR DETERMINING COMPUTER NETWORK TOPOLOGIES

(75) Inventor: Nicholas W. Dawes, Ottawa (CA)

(73) Assignee: Loran Networks Management Ltd., Bridgetown (BB)

( * ) Notice: Subject to any disclaimer, the term of this patent is extended or adjusted under 35 U.S.C. 154(b) by 0 days.

(21) Appl. No.: 09/349,155

(22) Filed: Jul. 8, 1999

(30) Foreign Application Priority Data

Dec. 16, 1998 (CA) .............................................. 2256203
Apr. 9, 1999 (CA) .............................................. 2268495

(51) Int. Cl.[7] .............................................. H04L 12/28
(52) U.S. Cl. ...................................................... 370/255
(58) Field of Search .......................... 370/254–8, 246, 370/250, 252

(56) References Cited

U.S. PATENT DOCUMENTS

| | | | | |
|---|---|---|---|---|
| 5,428,636 A | * | 6/1995 | Meier .......................... | 375/202 |
| 5,450,408 A | | 9/1995 | Phaal .......................... | 370/256 |
| 5,684,796 A | | 11/1997 | Abidi et al. ................. | 370/389 |
| 6,330,229 B1 | * | 12/2001 | Jain et al. .................... | 370/256 |

FOREIGN PATENT DOCUMENTS

| | | |
|---|---|---|
| EP | 0 588 744 A | 7/1993 |
| WO | 95/06989 | 8/1994 |

* cited by examiner

*Primary Examiner*—Seema S. Rao
*Assistant Examiner*—Ronald Abelson
(74) *Attorney, Agent, or Firm*—Shapiro Cohen; Dennis R. Haszko; Harold C. Baker

(57) ABSTRACT

A method of determining computer network topologies that dramatically reduces the computational complexity and greatly increases the accuracy of connection determination. The method involves classifying ports as either up or down. A source address table is compiled for each port of each data-relay device and each port is classified as either up or down. Up ports connect to other data-relay devices which report source address tables while down ports do not. After the classification, each source address in each up port table is replaced by the source address of the data-relay devices containing the down port whose table contains that source address. The tables of pairs of up ports are compared by intersection and minimal intersection defines the most probable connection for each up port. A variety of methods are used to remove invalid source addresses and the addresses of devices that have moved during the collection of the source address tables.

26 Claims, 1 Drawing Sheet

METHOD FOR DETERMINING COMPUTER NETWORK TOPOLOGIES

FIELD OF THE INVENTION

This invention relates to the field of data communication systems, and in particular to a method for determining the physical topology of a network of data communication devices.

BACKGROUND TO THE INVENTION

Operators of many data communications networks are ignorant of its topology. However, the operators need to know the topology in order to properly manage the network. Accurate diagnosis and correction of many faults requires such knowledge. This is described in the article "Network Diagnosis By Reasoning in Uncertain Nested Evidence Spaces", by N. W. Dawes, J. Altoft and B. Pagurek, IEEE Transactions on Communications, February 1995, Vol 43,2–4: pp 466–476.

Network management teams that do know the very recent topology of their network do so by one of three methods: an administrative method, an approximate AI method as described in U.S. Pat. No. 5,727,157 issued Mar. 10, 1998, invented by Orr et at, and PCT publication WO 95/06,989, but assigned to Cabletron, and the Loran traffic method as described in U.S. Pat. No. 5,926,462 issued Jul. 20, 1999 and entitled "Method of Determining Topology of A Network of Objects Which compares the Similarity of the Traffic Sequences/Volumes of a Pair of Devices". The data protocols the latter two use are described in the text "SNMP, SNMPv2 and CMIP. The Practical Guide to Network Management Standards". W. Stallings, Addison-Wesley, 1993 and updates.

The administrative methods require an entirely up to date record of the installation, removal, change in location and connectivity of every network device. Every such change in topology must be logged. These updates are periodically applied to the data base which the operators use to display or examine the network topology. However, in almost all such systems the actual topology available to the operators is usually that of the previous day or previous days, because of the time lag in entering the updates. This method has the advantage that a network device discovery program need not be run to find out what devices exist in the network, but has the disadvantage that it is almost impossible to keep the data base from which the topology is derived both free of error and entirely current.

The Cabletron method theoretically provides only one of the necessary elements for a method of determining network topologies: the deduction of a possible direct or transitive connection. However there are at least six problems with the Cabletron method even with this very limited goal.

1: problems with invalid source addresses and addresses of moved objects. This makes this method unusable under many conditions as it gives contradictory and incorrect results.
2: the requirement that network management reporting by devices be done by the device itself, not by a proxy agent which will reply using a different source address. Although not common, this makes any network with such a device unmappable by this method.
3: requirement that the source addresses of reporting devices appear commonly in network traffic, so that each reporting device has a reasonable chance of picking up the addresses of all the reporting devices it can. This is a major problem. In direct contrast, the only use the method of the present invention makes of the addresses of reporting data-relay devices directly available in tables is to define more up ports when it already knows some (see below).
4: a total inability to deal with the existence of unmanaged devices lying between managed devices.
5: computational complexity in very large networks means the Cabletron method takes so long to run that the network may well have changed before the calculations are complete.
6: the inability to deal with multiple connections between devices, for example between a switch and a segmented repeater.

The approximate AI methods use routing/bridging information available in various types of devices (eg: data routers contain routing tables). This routing information carries a mixture of direct information about directly connected devices and indirect information. The AI methods attempt to combine the information from all the devices in the network. This method requires that network device discovery program be run to find out what devices exist in the network, or that such a list of devices be provided to the program. These approximate AI methods require massive amounts of detailed and and very accurate knowledge about the internal tables and operations of all data communications devices in the network. These requirements make these AI methods complex, difficult to support and expensive. In addition, devices that do not provide connectivity information, such as ethernet or token ring concentrators must still be configured into the network topology by the administrative method. Finally the search of the AI methods has to be guided by expert humans for it to be successful, and even then there are many classes of topology it cannot determine. Consequently the approximate AI methods are not in general use.

The Loran traffic method exploits the fact that traffic flowing from one device to another device can be measured both as the output from the first and as the input to the second. Should the volume of traffic be counted periodically as it leaves the first and as it arrives at the second, the two sequences of measurements of the volumes will tend to be very similar. The sequences of measurements of traffic leaving or arriving at other devices will, in general, tend to be different because of the random (and fractal) nature of traffic. Therefore, the devices which have the most similar sequences will be most likely to be interconnected. Devices can be discovered to be connected in pairs, in broadcast networks or in other topologies. This method is therefore extremely general. However it depends on reasonably accurate measurements of traffic being made in both devices. In practice some devices do not report any information at all, let alone traffic. Other devices report incorrect values of traffic.

A method described in U.S. Pat. No. 5,450,408 issued Sep. 12, 1995, invented by Phall et al and assigned to Hewlett Packard Company relies on monitoring the source and destination of packets on lines in the network. From the sets of to and fro addresses the topology is eventually deduced. This requires hardware packet detectors to be added to many of the lines in the network and has nothing in common with the present invention.

SUMMARY OF THE INVENTION

An embodiment of the invention uses any source address to port mapping information in a device. Examples are bridge table, arp table, link training and source address capture data to determine classes of network topologies never previously determinable. In particular, the classes of topologies where one or more non reporting devices exist between sets of reporting devices are correctly determined. It includes a novel concept of up and down ports. Up ports interconnect devices which report tables, down ports do not. This concept dramatically reduces the computational complexity and greatly increases the accuracy of connection determination. The methods for distinguishing up and down are novel.

An embodiment of the invention also includes the novel determination that if an up port sees a source address also seen in a down port table then the up port sees the source address of the data-relay device with the down port. This removes entirely the dependence on data-relay devices seeing the source addresses of other data-relay devices directly, which undesirable dependence is essential to the Cabletron methods.

An embodiment of the invention involves removal of invalid and moved source addresses from the table data and is novel and so are all the methods for doing so. This makes the method approximately 100 fold less prone to error. It is more and more necessary as the use of portable computers becomes more widespread.

An embodiment of the invention provides for the explicit tradeoff of the accuracy of connections against the rapidity with which changes in the network are tracked is novel.

An embodiment of the invention determines whole families of topologies previously only handled by traffic patterns in the aforenoted Loran patent application: eg: multiple connections between switches and segmented hubs. When the traffic data is unavailable or is misreported by devices, this embodiment fills the need.

The invention can operate entirely automatically and requires no operator intervention or manual assistance. This is quite unlike the Cabletron method which requires a human expert to help it by restricting its search.

In accordance with an embodiment of the invention a source address table is compiled for each port of each data-relay device. Such ports are then classified as up or down. Up ports connect directly or indirectly to other data-relay devices which report source address tables while down ports do not. Up ports can be recognised as their source address tables intersect the tables on two or more ports on a single other data-relay device. Moreover, source addresses in the tables of down ports are not duplicated in the table of any other down port but are duplicated in the tables of up ports that directly or indirectly connect to the data-relay device that contains that down port. After classification as down or up, each source address in each up port table is replaced by the source address of the data-relay devices containing the down port whose table contains that source address. The up port tables now contain only data-relay addresses and the addresses of non table reporting devices indirectly connected to up ports. The tables of pairs of up ports are compared by intersection and the minimal intersection defines the most probable connection for each up port. The source addresses of devices in the table of a down port are defined as being directly or indirectly connected to that down port. The method can be applied repeatedly and the probabilities aggregated to provide arbitrary accuracy. A variety of methods are used to remove invalid source addresses and the addresses of devices that have moved during the collection of the source address tables.

A discovery program can be used to determine the list of devices in the network. A poller program extracts any source address to port mapping information, such as bridge table, arp table, link training data, source address capture and other table data such as, for example, Cisco Discovery Protocol, Cabletron Securefast table data from data-relay devices and produces for each port the set of source addresses perceived by that port over a given period of time.

The set of source addresses for any port over a given period of time can be created by one of two methods: by completely emptying it before filling it for that entire period of time, or by constructing it from a series of subsets, which represent portions of that period of time.

Which ports see frames transmitted through other devices with tables is first determined. These ports are termed up ports. The other ports with tables are termed down ports. The up ports see addresses seen by two or more ports on a single other device. The problem of determining the topology is divided into two: determining connections to down ports and determining connections between up ports. All objects seen off a down port are directly or indirectly connected to that down port. Any up port seeing an object connected to a down port on device B must be seeing frames passed through B, so it must see B. The sets of objects like B seen in this manner by up ports are now compared. The pairs of up ports for which the intersections of these sets are minimal are defined as connected. The existence of non-null intersections or multiple null intersections for a single port indicate the existence of a non table reporting object connected to that port and that its connections to other up ports lie through that object.

The division of the problem into up and down and then exploiting the results from down connections to solve the problems for up connections is novel.

In accordance with an embodiment of the invention, a method of determining the topology of a data network comprised of network devices including data relay devices, comprises:

(a) obtaining source address to port mapping data from the data relay devices, (b) producing for each port of each data relay device a set of source addresses perceived by each said port over a period of time, (c) defining as up ports, those of said ports which have carried data transmitted through devices with said mapping data, which devices have other ports than a port under consideration, and defining remaining ports other than the up ports as down ports, (d) defining connections to down ports from devices seen from a down port, and (e) defining connections between up ports and between up and down ports from the source addresses.

In accordance with another embodiment, a method of determining topology of a data network comprised of data relay devices and node devices, each data relay device having one or more ports, comprises:

(a) compiling a source table for each port of each data relay device, (b) classifying ports as up ports, those ports which connect directly or indirectly to other data relay devices which report source address tables, (c) classifying ports which connect directly or indirectly to other data relay devices which do not report source address tables, as down ports, (d) replacing each source address in each up port table by a source address of data relay devices containing the down port whose table contains that source address, whereby the up port tables thereby contain only data relay addresses and addresses of non table reporting devices indirectly connected to up ports, (e) comparing port tables of pairs of ports by intersection, and
(f) defining a most probable connection for each up port by locating a minimal intersection.

BRIEF INTRODUCTION TO THE DRAWINGS

A better understanding of the invention may be obtained by reading the detailed description of the invention below, in conjunction with the following drawings, in which.

DETAILED DESCRIPTION OF EMBODIMENTS OF THE INVENTION

The following definitions will be used in this specification:

$A_i$: Port i is in device A;

Data-relay device: a device that receives frames of data on one or more ports and retransmits them on one or more ports.

Device: a network device communicates via ports with one or more other network devices. Examples of devices are workstations, repeaters, switches and routers. The latter three are all data-relay devices.

$S(A_i)$: the set of source addresses recorded from frames that entered that port over the table collection period.

$NS(A_i, B_j)$: the number of members in the set formed by the intersection of $S(A_i)$ and $S(B_j)$. It counts how many devices are seen by both $A_i$ and $B_j$.

V: The visible set $V(A_i)$ for up port $A_i$ is the set of all devices with tables that Ai sees. $V(A_i)$ includes B if $NS(A_i, B_j)>0$ for any j.

$NV(A_i, B_j)$: the number of members in the set formed by the intersection of $V(A_i)$ and $V(B_j)$. It counts how many table providing devices are seen by both $A_i$ and $B_j$.

Port: a port is an interface by which the device may send or receive communications.

Source address: a unique label assigned to each hardware device by the manufacturer. These are often called MAC addresses, but this method is not limited by any particular addressing scheme.

T: the set of all network devices which have source address tables.

Up/Down port: If device A is in set T and $A_i$ connects directly or indirectly to one or more devices in set T then port $A_i$ is up. Down ports are any port that is not an Up port for some period of time as will be described below.

VLAN: a virtual, usually impermanent, mapping of a logical network over a physical network.

X: The set of all down ports in the network.

Y: The set of all devices in the network seen by down ports.

UN(A): The number of up ports that exist in the network device A.

UN: The number of up ports that exist in the network.

Figure 1:
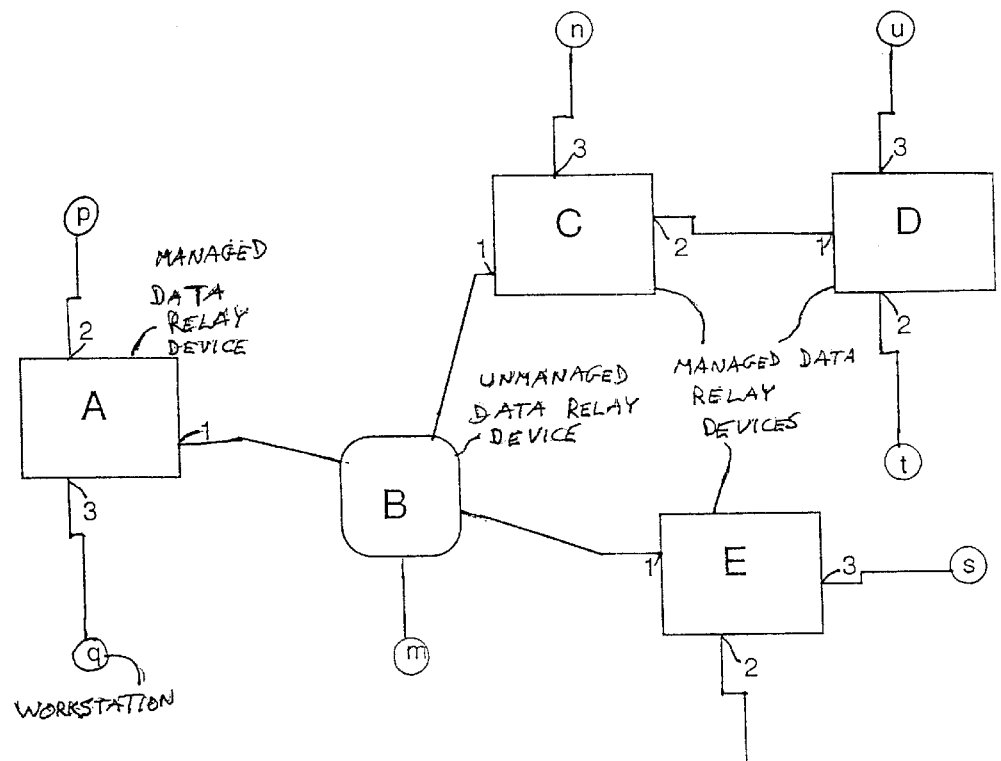
FIG. 1 is a block diagram of a representative network.

With reference to FIG. 1, in the network shown there are four data-relay devices (A,C,D,E) which report tables and one (B) which does not. There are also eight workstations (n,m,p,q,r,s,t,u) which are connected to ports on these devices. Port numbers are shown for the devices which report tables. Device B does not report any information so its ports are unknown and therefore are shown unnumbered.

Note that the source addresses of the managed devices A,C,D and E and of the unmanaged device B need not be available in any table.

The source addresses in the tables from each port are as follows:

S(A1)=m,n,u,t,s,r
S(A2)=p
S(A3)=q
S(C1)=p,q,s,r,m
S(C2)=u,t
S(C3)=n
S(D1)=n,m,p,q,r,s
S(D2)=t
S(D3)=u

All the ports with tables are evaluated periodically to determine which ports are up and which are down. Generally if a port sees only one device it will be down, but there are three other methods for recognising up ports. The first and second methods work on the first and all subsequent evaluations. The third method works on the second and all subsequent evaluations.

First Method:

If $NS(A_i, B_j)>0$ and $NS(A_i, B_k)>0$ and A<>B and k<>j then $A_i$ is an up port.

This means that if $A_i$ sees devices seen on port $B_j$ and also sees devices seen on port $B_k<>_j$ then $A_i$ must be an up port.

Example with the network of FIG. 1:

A1 is an up port because $NS(A_1, E_2)>0$ and $NS(A_1, E_3)>0$.

Second Method:

If the intersection of $S(A_i)$ and T is not zero, then $A_i$ is an up port.

This means that if $A_i$ sees the source addresses of any up port then it must be an up port. This rather rarely occurs but is included for completeness.

Third Method:

If $B_j$ is a down port and $B_j<>A_i$, then $A_i$ is an up port if: $NS(A_i, B_j)>=1$ In other words, only up ports can see devices which are seen by down ports.

This method can be refined by requiring that only if a port is not defined as up over several evaluations can it be defined as down and therefore in set Y. This overcomes problems in sparse sets. It can be made even more robust by requiring that $NS(A_i, Y<>A_i)>=K$ where K is >1. However, this is at the cost of failing to identify some up ports by this method or taking longer to do so.

This method is computationally cheaper if the ports in Y are sorted by the size of their sets and the smallest compared first.

Example with the network of FIG. 1:

$A_1$ is up port because $NS(A_1,C_2)+NS(A_1, C_3)+NS(A_1, D_2)+NS(A_1,D3) \ldots >=1$.

All devices whose source addresses are in the table of a down port are connected directly or via one or more unmanaged devices or moved devices not reporting source address information to that port, as no other table reporting device can be in this table. If there is only one device in the table of a down port, it is directly connected to Ai. If there is more than one, then all these devices are connected indirectly via a cloud to Ai. The cloud represents one or more connected and unmanaged or improperly reporting devices. The Loran Patent application noted above described other methods for making connections which can override these table defined connection suggestions.

Up ports are directly or indirectly connected only to other up ports. Moreover only devices with up ports need be considered in determining how up ports are interconnected. Finally, if an up port sees the source address of an device which is also seen by a down port, this up port can be considered to seeing the device which includes that down port. Exploitation of these three observations leads to three very important effects: greater accuracy in making connections, the computational effort is enormously reduced and the existence and placement of unmanaged devices can be accurately deduced.

The proportion of up ports to down ports in a network has been determined to typically be at least 1:10. The number of managed devices with up ports in a network is typically less than 10% of all devices in the network. Almost all devices with tables have at least one up port so that proportion of devices with tables is also 10% of all devices in the network.

The probability of making a mistake in an up port connection is therefore reduced by a factor of up to 100 in comparison to any method that does not consider up port conditions, as the number of possible choices is very greatly reduced. Moreover, the probability of a down port seeing other devices with down ports is immensely greater through the mapping from down ports than by seeing their source addresses directly. Experiments show this probability is at least 10 times and is often infinitely greater.

Each up port has created for it a table of the devices with up ports that it can see. The overlap of these tables is assessed. This process is order $N^2M$ where N is the number of up ports and M is the number of devices with tables. Since only up ports are considered, N is $\frac{1}{10}$ of that if all ports were considered. Since only devices with tables are considered, M is only $\frac{1}{10}$ that if all devices were considered. Computational effort is therefore reduced by a factor of 1000.

The third major effect is the ability to deduce the existence of unmanaged devices lying between up ports. The way in which this is done is show below. It too is a major advance in the state of the art.

The set of up ports which lie between port $A_i$ and any other device B in T and which includes $A_i$ is the set for which $NV(A_i,B_j)$ is minimal for either $A_i$ or $B_j$. The determination of the sets has three steps:

1: determine the set V for each up port,
2: determine NV(Ai, Bj) for pairs of ports which can be compared as described herein and for which $V(A_i)$ includes B and $V(B_j)$ includes A,
3: determine the minimum $NV(A_i,B_j)$ for all ports.

The set $V(A_i)$ describes all devices with up ports that up port $A_i$ definitely sees. $V(A_i)$ also includes A.

The set $V(A_i)$ contains all devices B for which at least one of the following four conditions is true:

1: B=A
2: $NS(A_i, B_j)>0$ and $NS(A_i, B_{k<>j})>0$
3: $S(A_i)$ includes B
4: $S(B_j)$ includes A Example with the network of FIG. 1:

$V(A_1)$=A, C, E, D
$V(C_1)$=A, C, E
$V(C_2)$=C, D
$V(D_1)$=A, C, E, D
$V(E_1)$=A, C, E, D

Now $NV(A_i, B_j)$ for pairs of ports which can be compared is determined:

If $NV(A_i, B_j)=NV(Ai, Ck)$ and C has one up port while B has more than one, then the connection is probably $A_i$–$B_j$ and not $A_i$–$C_k$. Therefore the determination of $NV(A_i, B_j)$ is done in three passes and the comparisons done in each pass depend on the multiplicity of up ports in devices compared. This is explained below. When the set of values of $NV(A_i, B_j)$ is complete it is checked to make sure connections forbidden in spanning tree are rejected as will be explained below. The most probable connections are those with the lowest values of $NV(A_i, B_j)$.

UN(A) is the number of up ports on device A. In the example network shown in FIG. 1 the values of UN are as follows.

UN(A)=1
UN(C)=2
UN(D)=1
UN(E)=1

The determination of $NV(A_i,B_j)$ is done in three passes. In each pass devices are selected as being comparable only if they meet the criteria for that pass. Comparisons made in earlier passes and which have the same NV value are more probable.

| Pass: | source | target |
| --- | --- | --- |
| 1: | UN(A) > 1 | UN(B) > 1 |
| 2: | UN(A) > 1 | UN(B) = 1 |
| 3: | UN(A) = 1 | UN(B) = 1 |

The validity of the comparison of V(Ai) and V(Bj) is then checked.

Multiple connections between two devices are forbidden in many networks (ie: spanning tree between two switches). A method is described below how to remove information related to VLAN exceptions to this. Therefore if $NV(A_i, B_j)=NV(A_i, B_{k<>j})$ the validity of all $NV(A_i,B_j)$ can be checked as follows.

All the $NV(A_i, B_j)$ are discarded unless: either A or B (or both) are segmented devices, and $NS(A_i, B_{k<>j})>0$ such that k is in the same segment as j or $NS(B_j, A_{k<>i})>0$ such that k is in the same segment as i.

Figure 2:
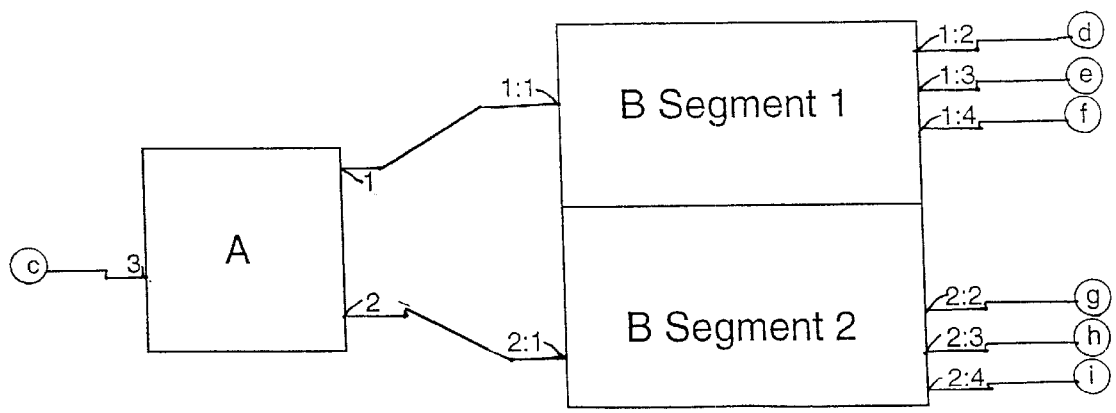
FIG. 2 is an example of a detail of the network of FIG. 1.

Now consider the example in FIG. 2:
Both $NV(A_1, B_{1:1})$ and $NV(A_1, B_{2:1})=0$:
A1 is connected to segment 1 of B and so:
$NS(A_i, B_{1:2})>0$ so $NV(A_1, B_{1:1})$ is not discarded.
$NS(A_i, B_{2:n})=0$ for n=2,3,4 so $NV(A_1, B_{2:1})$ is discarded.
The minimum $NV(A_i,B_j)$ for all ports is then determined. Connections are made to $A_i$ from all $B_j$ such that $NV(A_i, B_j)<=NV(Q, B_j)$ for any Q. The presence of multiple connections to a single port $A_i$ indicates the existence of one or more unmanaged devices between the various up ports attempting to connect to $A_i$. This unmanaged device or devices is represented as a single cloud to which is connected $A_i$ and all the $B_j$ for which connections to $A_i$ are suggested.

Once the connection of a set of up ports F is determined, the intersection of all the S(F) defines the set of devices to be interconnected, such that the ports of devices with up ports have been defined but the ports of devices without tables may not, if the source address in the S(F) is not unique to a port on that device, the port will be defined as unknown.

First all pairs of up ports for which NV(Ai, Bj)=0 are connected. Almost always these will be direct connections. However, if in the network of FIG. 1 the unmanaged device B was directing traffic to A only from E and from C only to E, then $NV(A_1,E_1)$ and $NV(C_1, E_1)$ would both equal 0.

Under these conditions a cloud would represent B and the correct ports on A, B and C connected to this cloud.

Next all pairs of ports for which $NV(A_i, B_j)$ is non zero are considered. Rings of connections are found such that $NV(A_i,B_j)=NV(A_i,C_k)$. These rings are suggestions of the set of the up ports to be interconnected. FIG. 1 has the ring $A_1$, $C_1$ and $E_1$. The intersected set of $S(A_1)$, $S(C_1)$ and $S(E_1)$=m. Therefore this embodiment produces the connections of these three up ports and the device m, all connected to a single cloud which represents one or more interconnected and unmanaged devices. In this example this cloud just represents the device B.

If a device has a source address which appears on only one port, then it is possible for the two methods described above to uniquely identify the port for a connection. If the source address occurs on more than one port on that device, then the port to which the connection should be made is unknown, unless further data is used and this connection is the only one suggested to a downport. The data is used to determine which of the possible ports is the most probable candidate by comparing the candidate port to the downport. This data includes any quality measurable on the ports in question: eg: frame rate, byte rate, collision rate, broadcast rate, line status flag, line interface type, line speed etc. Several of these have been explained in detail in the Loran patent specification referred to earlier.

Connections proposed by down ports and by up ports are based on data which is not current and may have been collected over many hours or even days. Also the data is almost always incomplete, due to sampling considerations for source address capture tables and due to aging of bridge and arp tables. Therefore the probability that the connection suggested is correct depends on the completeness of the data available and on the stability of the network. It also depends on the timelines of the data. For example, data collected before a change in the topology would refer to the topology before the change, while that collected afterword refers to the topology after the change.

The description below describes how to tradeoff the accuracy of connections against the rapidity with which changes in the network are tracked.

Since the methods are performed periodically, they can produce somewhat different results even with a completely static network topology, depending on the sparseness of the table data collected.

Assume that a connection is suggested from port $A_i$ to $B_j$ by one of the two methods described and that $A_i$ has a table of non zero size ($S(A_i)>0$).

Now define:

C: the probability that a connection suggestion is correct.

P1: the probability a connection will be correct and will be confirmed.

P2: the probability a suggested connection will be correct.

R: how often in succession this same new suggestion has been made for $A_i$ and $B_j$ T: how many times the previous connection of $A_i$ to X and $B_j$ to Y have failed to be confirmed (if any connections to $A_i$ or $B_j$). The minimum of either is chosen.

Probability the previous connection to $A_i$ or $B_j$ is correct=$(1-P_1)^T$ 1.1

Probability the suggested connection of $A_i$ to $B_j$ is wrong=$(1-P_2)^R$ 1.2

Probability inserting the new connection is wrong=$(1-P_1)^T (1-P_2)^R$ 1.3

For example: Let P1=0.7, P2=0.6, T=3 and R=2

Thus the probability inserting the new connection is wrong=0.004.

By choosing T and R and by measuring P1 and P2 the method can be made to tradeoff accuracy of topology changes against how rapidly it makes them. $P_1$ can be measured by the recent history of confirmations by the method of its previous suggestions. $P_2$ is measured by determining how frequently suggestions are rejected with T=0 and R=1.

The longer the period of time over which table data is collected, the higher the probability that any suggested connection for a connection which has not been moved will be correct. Since the probabilities are measurable, the method can either aggregate reports over a period of time until the connections are sufficiently believable, or the result can be ignored until the probability has improved due to network conditions returning to normal.

Average networks have been determined to have approximately a 1% level of incorrect table data. Bad networks can have levels as high as 10%. This incorrect table data needs to be identified and then removed from the tables. The methods described below reduce the level of incorrectable data by more than 100 fold. In most networks this means practically no faulty data gets through to the connection methods described above. In turn this greatly improves the accuracy and hence the rapidity with which the topology can be determined. This concept of removing noise from the source address table data is novel and so are all the methods for doing so.

There are five reasons why the table data can be wrong. For each of the reasons a corresponding method is described which detects and removes the faulty data. The operator can also be warned or alerted about these conditions.

1: Movement of devices in the network. When a device is moved from one place to another, its address will, for a while, turn up as if it were in both places at the same time. Test devices or portable computers which are put in many places during a day often have multiple apparent locations.

2: Invalid source addresses. The device reporting the table data may have collected invalid source addresses in its table or misreports them. These addresses do not refer to any device. This is rather common for source address capture in busy ports on some repeaters.

3: Duplicate source address. The same source address is used in more than one device at the same time. This is forbidden by the standards but happens due to poor manufacturing quality control.

4: Old addresses not being removed from the table. The device should remove addresses periodically from the tables. Sometimes the software in the device fails to do so. For example, when devices are moved their addresses may persist at each port to which they were previously connected. This leads to confusing multiple reporting of this source address.

5: Operator mistakes. The network operator can program some devices to permanently remember some addresses. Should the device then be moved these addresses will be continue to be reported as if the device were still connected the same way. Again this leads to confusing multiple reporting of this source address.

Movement of Devices From One Place to Another

Moving a device from one place to another can cause the same device to appear in incompatible tables, since the table data is collected over a long period of time. The following move detector logic detects moves and removes all data about moved devices from the tables in consideration.

There are three methods that detect movement. When a device has been defined as moved, all tables that could overlap in time when that move occurred have this device removed.

There is an exception to this. If the movement is to a down port, then the address is left in the table of this down port only. Clearly if multiple down ports see the same address, then the most recently observed port to see it will claim the connection.

The detection and reaction to movement is important to the automatic adaptation of the method's suggested topology to the physical topology. This extends Loran's original invention in a novel way. Loran's specification states that the network topology can be determined after time T and then again at time T+dt. It also states that should there be no changes in the topology the operator could be informed of this, which indicates a stable solution has been found. Should a stable solution be found and then change, that indicates that an object has moved or that something has broken or become faulty. The particular change will help define this.

(a) is Known to Have Moved:

A device A has moved if its connection has been determine to have changed. This could be by one of the methods in this specification or otherwise, for example by one of the methods described in the Loran specification noted above, or otherwise.

(b) Seen on an Up and a Down Port Both on the Same Device:

A device is defined as moved if:

A exists in both $S(B_i)$ and $S(B_{k<>i})$ and $B_i$ is an up port and $B_k$ is a down port in device B.

However, if B is a segmented repeater with more than one up port then both these B ports must be in the same segment or must share the same output traffic pattern (as described in the Loran specification).

(c) Seen on Two Down Ports:

A device A is defined as moved if:

A exists in both $S(B_i)$ and $S(C_k)$ and both $B_i$ and $C_k$ are down ports.

A special case of this exists where A exists in both $S(B_i)$ and $S(B_k)$ where k<>i, which does not lead to any consideration that $B_i$ and $C_k$ might now be up ports.

Invalid Source Addresses

Invalid source addresses do not refer to any real device and are often created by bit rotations of valid source addresses. The following methods detect valid addresses.

(a) A source address is valid if it has been reported by a down port which sees only this source address.

(b) A source address is valid if it has ever been reported by two or more ports within a given period of time.

(c) A source address is valid if it has ever been successfully used in an SNMP query.

In some networks of N objects, as many as N/10 different invalid source addresses are generated a day.

Duplicate Source Address

The same source address is used in more than one device at the same time. This is detected by the same source being labelled by more than one TCP/IP address. In more detail, should source X be seen with TCP/IP A, and then should source X be seen with TCP/IP B and then again seen with TCP/IP A all within the same period of time, then source X is being used both in device A and in device B. This period is chosen to be less than the time in which an IP can be changed automatically (by DHCP) or manually. Duplicate source addresses are removed from all tables.

Old Addresses not Being Removed From the Table

When the function called aging fails in data relay devices such as switches or routers, the tables the data relay keeps may never change. Therefore these tables refer to the past and can cause many problems. However, aging failure almost always results in some of the devices seen by the data relay device being only seen by the data relay device (as they have now been removed from the network). The solution is to first diagnose the failure of the aging function and then reject all table information from devices in which this failure has been detected. An alternative rejection method would be to reject all source addresses in tables on down ports in devices where this function has failed which conflicts with down port tables on devices where it has not failed. A third method, which can be used in combination with the second, is to accept source address in tables on up ports in devices where this function has failed only if the source addresses are seen in other up ports. Finally, the operator can be alerted or alarmed about the failure of this aging function on each such device where it has been diagnosed as failing.

Let:

D=number of devices in the set of all tables seen on A that have not been seen elsewhere for a week.

N=number of devices in the set of all tables seen on A. if D/M>a threshold then A probably has aging problems.

An alternative method counts how many devices seen on A have been moved, and when this ratio exceeds some threshold then A probably has aging problems.

A further alternative combines the count of D and the count of moved devices and applies a threshold to this or its percentage of N.

Operator Mistakes

Operators sometimes program in static information into a table for an device A and forget to remove them when they move A. This can be detected either by the move detector or when the source address of the mistaken device lies outside the TCP/IP subnet of any subnet supported by the same port of the router that supports the subnet of A. This method therefore handles VLAN subnetting.

The source addresses that are in error in this way can be removed from the source address table(s) of this device. The operator can be alerted or alarmed about this condition in each such device it is detected in.

Excessive VLAN Configuration Change Rate Detection and Reporting

Ethernet switches cannot have more than one physical connection in use at the same time to a single other switch. However, they can have more than one physical connection to a single other switch, and only use one at a time. VLAN protocols let switches automatically change which line they use, from time to time. Under these conditions the tables in both of these lines will contain similar entries if the line changing occurred more recently than the discard period for data from the tables (see below). If the VLAN changes are made very frequently, this causes disruption of the source address tables from the switches and so it is appropriate to alert the network operator of this condition. This condition will slow down the rate of connection by the methods described here and will also adversely affect the performance of the network.

Let $B_i$ be physically connected to $C_p$ and $B_j$ be physically connected to $C_q$. Let B and C periodically change which of this pair of connections is in use and let sets of source addresses be recorded from $B_i$ and $B_j$.

Let N be the number of source addresses seen both in $S(B_i)$ and in $S(B_j)$ (i.e.: the intersection) and which are known not to have been moved during the period of collection of these two sets.

Let M be the number of source addresses in $S(B_j)$, excluding those known to have been moved during the period of collection of these two sets. The lower M is, the more likely a false report would be should a movement of one or more objects not have been detected otherwise before this analysis.

Let: $F=N/M$

Then: when F is greater than some threshold and M simultaneously greater than some threshold, it is probable that the in use connection from B to C has recently changed between $B_i$ and $B_j$. Under these conditions the operator can be alerted. The higher F is, the more certain it is that the in use connection was recently changed.

A suitable threshold for F was found to 0.5 and a suitable value of M found to be 5.

The detection of the change can be both confirmed and dated by detection of the traffic levels on these connections. When one connection changes from quiescent to active and at the same time the other changes from active to quiescent, that indicates the time of changeover.

If a device does not support simultaneous active connections to a single other device, the source addresses which are common to the sets in the up ports of such devices can be removed from these sets, except for the set where it was recorded most recently. Other methods could be used to choose the most appropriate set, such as that set which sees it most often, or the entries in common could be removed entirely.

The set of source addresses for any port over a given period of time can be created by one of two methods: by completely emptying it before filling it for that entire period of time, or by constructing it from a series of subsets, which represent portions of that period of time.

Let a set $S(B_i)$ contain the source addresses for $B_i$ over the period of time $T_1-T_2$.

Let this period $T_1-T_2$ have been subdivided into N equal or unequal subperiods of time.

Let subsets $R(B_{i,t})$ contain the source addresses for $B_i$ over subperiod t where $t=1 \ldots N$.

Then:

$S(B_i)=\text{intersection}(R(B_{i,t}))$ for $t=1 \ldots N$.

The present invention has been subjected to three classes of tests, those in simulated networks, those in customer networks whose topology is known and those in networks where the topology is unknown.

Simulations have been carried out to determine the validity of the logic for a wide variety of different topological structures (e.g.: a switch connected by many redundant links to a segmented repeater). These simulations also verified the robustness in the face of incorrect and sparse table data.

Tests in networks where the customer knows the topology allowed more practical tests. In a test of a network of 3000 objects the determination of connections was 95% complete using 36 hours of data. All were correct. The remaining connections required more data to determine exactly. The method described in this specification typically required less than 2 minutes of P180 CPU (central processing unit) time to perform this task.

Finally in networks in which the topology was unknown, connections found in accordance with the present invention which are directly between objects were crosschecked by the methods of traffic which is the subject of the aforenoted Loran patent specification, which method now has an extensive history and well determined accuracy. These results verified the accuracy and processor efficiency of the present invention.

A person understanding the above-described invention may now conceive of alternative designs, using the principles described herein. All such designs which fall within the scope of the claims appended hereto are considered to be part of the present invention.

I claim:

1. A method of determining the topology of a data network comprised of network devices including data relay devices, comprising:

(a) obtaining source address to port mapping data from the data relay devices, (b) producing for each port of each data relay device a set of source addresses perceived by each said port over a period of time, (c) defining as up ports, those of said ports which have carried data transmitted through devices with said mapping data, which devices have other ports than a port under consideration, and defining remaining ports other than the up ports as down ports, (d) defining connections to down ports from devices seen from a down port, and (e) defining connections between up ports and between up and down ports from the source addresses.

2. A method as defined in claim 1, in which a set of the source addresses is obtained by constructing the set from a plurality of subsets, each of which represents portions of said period of time.

3. A method as defined in claim 1 in which step (d) is comprised of defining a connection between a device and a down port in the event the latter device is seen off the down port.

4. A method as defined in claim 3 in which step (e) is comprised of comparing sets of objects with up ports and objects connected to a down port seen by the up port and defining connection of pairs of up ports for which the intersection of these sets are minimal.

5. A method as defined in claim 4 including the further step of restricting the comparison of up port A to up ports of each device B such that the set of objects seen directly and indirectly by A has non-zero intersection with the sets seen on multiple ports on B or that the set of A includes B and that this restriction is applied to both up ports in each such comparison.

6. A method as defined in claim 5 including defining the existence of a non-address table reporting object connected to an up port through which connections to other ports lie, in the event of the existence of non- or multiple-null intersections for said up port.

7. A method as defined in claim 1 in which the source address to port mapping data is one of bridge table data, arp table data, link training data, source address capture data and other table data.

8. A method as defined in claim 1 in which the compiling step is performed by first running a discovery program to determine a list of devices in the network, then running a poller program to extract source address to port mapping information from data relay devices, and providing for each port a set of source addresses perceived by said each port over a period of time.

9. A method as defined in claim 6 in which the compiling step is performed by first running a discovery program to determine a list of devices in the network, then running a poller program to extract source address to port mapping information from data relay devices, and providing for each port a set of source addresses perceived by said each port over a period of time.

10. A method as defined in claim 9 in which the source address to port mapping data is one of bridge table data, arp table data, link training data, source address capture data and other table data.

11. A method of determining topology of a data network comprised of data relay devices and node devices, each data relay device having one or more ports, comprising:
   (a) compiling a source table for each port of each data relay device,
   (b) classifying ports as up ports, those ports which connect directly or indirectly to other data relay devices which report source address tables,
   (c) classifying ports which connect directly or indirectly to other data relay devices which do not report source address tables, as down ports,
   (d) replacing each source address in each up port table by a source address of data relay devices containing the down port whose table contains that source address, whereby the up port tables thereby contain only data relay addresses and addresses of non table reporting devices indirectly connected to up ports,
   (e) comparing port tables of pairs of ports by intersection, and
   (f) defining a most probable connection for each up port by locating a minimal intersection.

12. A method as defined in claim 11, including repeating steps (a)–(f) continuously and aggregating the probabilities of connection between ports, until a predetermined accuracy of indicated connection has been determined.

13. A method as defined in claim 12 in which the compiling step is performed by first running a discovery program to determine a list of devices in the network, then running a poller program to extract source address to port mapping information from data relay devices, and providing for each port a set of source addresses perceived by said each port over a period of time.

14. A method as defined in claim 11, in which step (f) includes determining the existence of non-null intersections or multiple null intersections for a particular port and thereby defining the existence of a non-table reporting object connected to the particular port and thus that connections from the particular port to other ports lie through the non-table reporting object.

15. A method as defined in claim 1 in which step (c) is comprised of at least one of the following:
   (i) defining $A_i$ as an up port if $NS(A_i,B_j)>0$ and $NS(A_i,B_k)>0$ and $A<>B$ and $k<>j$
      where $NS(A_i,B_j)$ is the number of members of a set formed by the intersection of $S(A_i)$ and $S(B_j)$
      where $S(A_i)$ is the set of source addresses recorded from the port i in device A;
   (ii) defining $A_i$ as an up port if the intersection of $S(A_i)$ and T is not zero
      where T is the set of all network devices which have source address tables; and
   (iii) if $B_j$ is a down port and $B_j<>A_i$, then $A_i$ is an up port if $NS(A_i,B_j)>=1$.

16. A method as defined in claim 1 including performing steps (a), (b) and (c) using either or both of steps (i) and (ii) and repeating steps (a), (b) and (c) from time to time using step (iii).

17. A method as defined in claim 15 including defining a port as a down port in the event it has not been defined as an up port over several repetitions of steps (a), (b) and (c).

18. A method as defined in claim 15 including the further step of comparing sets of objects connected to a down port seen be the up port and defining connection of pairs of up ports for which these sets are minimal.

19. A method as defined in claim 18 including sorting all of the ports in a set of all devices in the network seen by down ports, by size of sets, and comparing the smallest port sets prior to comparing larger sets.

20. A method as defined in claim 17 further including requiring that
$NS(A_i,Y<>A_i)>=k$, where $k>1$,
   Where Y is the set of all devices in the network seen by down ports.

21. A method as defined in claim 4 in which the comparing step is comprised of the steps of:
   (i) determining a set V for each up port,
   (ii) determining $NV(A_i,B_j)$ for pairs of ports which can be compared, and
   (iii) determining a minimum $NV(A_i,B_j)$ for all ports,
      wherein 1. the set $V(A_i)$ describes all devices with up ports that up port $A_i$ definitely sees, including device A,
      2. the set $V(A_i)$ contains all devices B for which at least one of the following conditions is true $$B=A \tag{I}$$

$$NS(A_i,B_j)>0 \text{ and } NS(A_i,B_{k<>j})>0 \tag{II}$$

$$S(Ai) \text{ includes } B, \text{ and} \tag{III}$$

$$S(Bj) \text{ includes } A, \tag{IV}$$

3. comparing pairs of ports only if $V(A_i)$ includes B and $V(B_j)$ includes A.

22. A method as defined in claim 1, including removing incorrect source address to port mapping data prior to step (c).

23. A method as defined in claim 22 comprising the steps of determining and removing at least one of the following types of addresses prior to step (c):
   (i) duplicate addresses caused by movement of devices in the network,
   (ii) invalid addresses,
   (iii) duplicate source addresses caused by use of the same source address in more than one device at the same time,
   (iv) old addresses not in use, and
   (v) addresses created by operator mistakes.

24. A method as defined in claim 23 in which an address (i) is seen on both an up and a down port on the same device, or is seen on two down ports, or if the connection of a device has been determined to have changed but its address is duplicated.

25. A method as defined in claim 23 in which a source address (ii) is determined as being not invalid if it has been reported by a down port which sees only this address, if it has ever been reported by two or more ports within a given period of time, or if it has ever been successfully used in an SNMP query.

26. A method as defined in claim 23 in which address (iv) are all rejected from devices which have been determined as having failed by operation of an aging function thereof.

* * * * *